（12）United States Patent
Bui et al.

(10) Patent No.: US 12,217,054 B2
(45) Date of Patent: *Feb. 4, 2025

(54) METHOD OF STORING REGISTER DATA ELEMENTS TO INTERLEAVE WITH DATA ELEMENTS OF A DIFFERENT REGISTER, A PROCESSOR THEREOF, AND A SYSTEM THEREOF

(71) Applicant: TEXAS INSTRUMENTS INCORPORATED, Dallas, TX (US)

(72) Inventors: Duc Quang Bui, Grand Prairie, TX (US); Alan L. Davis, Sugar Land, TX (US); Dheera Balasubramanian Samudrala, Richardson, TX (US); Timothy David Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,113

(22) Filed: Sep. 16, 2022

(65) Prior Publication Data

US 2023/0015163 A1 Jan. 19, 2023

Related U.S. Application Data

(63) Continuation of application No. 16/786,457, filed on Feb. 10, 2020, now Pat. No. 11,449,336.

(Continued)

(51) Int. Cl.
*G06F 9/30* (2018.01)
*G06F 9/38* (2018.01)

(52) U.S. Cl.
CPC ...... *G06F 9/30018* (2013.01); *G06F 9/30036* (2013.01); *G06F 9/30038* (2023.08);
(Continued)

(58) Field of Classification Search
CPC ............ G06F 9/30018; G06F 9/30036; G06F 9/30032; G06F 9/30043; G06F 9/30105;
(Continued)

(56) References Cited

U.S. PATENT DOCUMENTS 5,768,564 A 6/1998 Andrews et al.
6,266,758 B1 * 7/2001 van Hook ................. G06F 5/00
712/E9.034

(Continued)

FOREIGN PATENT DOCUMENTS

CN 108647044 A 12/2011
WO 2019016508 A1 1/2019

OTHER PUBLICATIONS

International Search Report for PCT/US2020/034457 mailed Aug. 20, 2020.

*Primary Examiner* — Andrew Caldwell
*Assistant Examiner* — Kasim Alli
(74) *Attorney, Agent, or Firm* — Michael T. Gabrik; Frank D. Cimino

(57) ABSTRACT

A method of storing register data elements to interleave with data elements of a different register, a processor thereof, and a system thereof, wherein each non-consecutive data elements of a register is retrieved to be stored to interleave with each non-consecutive data elements of a different register upon an executive of an interleaving store instruction, wherein a mask instruction directing a lane of a storage space in which the non-consecutive data elements are stored is executed in conjunction with the interleaving store instruction, and wherein a processor of a second type is configured to emulate a processor of a first type to store the non-consecutive data elements the same as non-consecutive data elements stored in the first type processor.

18 Claims, 6 Drawing Sheets

Related U.S. Application Data

(60) Provisional application No. 62/852,918, filed on May 24, 2019.

(52) U.S. Cl.
CPC ...... G06F 9/30043 (2013.01); G06F 9/30047 (2013.01); G06F 9/30105 (2013.01); G06F 9/3895 (2013.01)

(58) Field of Classification Search
CPC ............. G06F 9/30109; G06F 9/30038; G06F 9/30112; G06F 9/30072; G06F 9/3017; G06F 9/30174
See application file for complete search history.

(56) References Cited

U.S. PATENT DOCUMENTS

| | | | |
|---|---|---|---|
| 6,564,302 B1 | 5/2003 | Yagi et al. | |
| 7,813,909 B2 * | 10/2010 | Sargaison | G06F 9/45504 703/20 |
| 9,146,738 B2 | 9/2015 | Morris | |
| 2005/0172106 A1 * | 8/2005 | Ford | G06F 9/30036 712/210 |
| 2012/0216011 A1 | 8/2012 | Gove et al. | |
| 2013/0024647 A1 | 1/2013 | Gove | |
| 2017/0192780 A1 * | 7/2017 | Valentine | G06F 9/30101 |

* cited by examiner

METHOD OF STORING REGISTER DATA ELEMENTS TO INTERLEAVE WITH DATA ELEMENTS OF A DIFFERENT REGISTER, A PROCESSOR THEREOF, AND A SYSTEM THEREOF

RELATED APPLICATIONS

This application is a continuation of U.S. patent application Ser. No. 16/786,457, filed on Feb. 10, 2020, which claims priority to U.S. Provisional Application No. 62/852,918, filed on May 24, 2019, each of which are incorporated by reference herein in its entirety.

BACKGROUND

Digital signal processors (DSP) are optimized for processing streams of data that may be derived from various input signals, such as sensor data, a video stream, a voice channel, radar signals, biomedical signals, etc. Digital signal processors operating on real-time data typically receive an input data stream, perform a filter function on the data stream (such as encoding or decoding) and output a transformed data stream. A typical application requires memory access to load data registers in a data register file and then supply data from the data registers to functional units which perform the data processing.

One or more DSP processing cores may be combined with various peripheral circuits, blocks of memory, etc. on a single integrated circuit (IC) die to form a system on chip (SoC). These systems may include multiple interconnected processors that share the use of on-chip and off-chip memory. A processor may include some combination of instruction cache (ICache) and data cache (DCache) to improve processing. Furthermore, multiple processors, with memory being shared among them, may be incorporated in a single embedded system. The processors may physically share the same memory.

Modern microprocessors may execute instructions in several steps. These steps include steps to read the instruction from memory, decode the instruction, read the values to be operated on, perform the operation, and write the result to storage. Sometimes referred to as "pipeline processing," a processor performing these steps has several instructions executing at the same time in different phases, i.e. "in the pipeline". In this mode of operation, the processor can be fetching an instruction while it is decoding the previous instruction, reading input values for an earlier instruction, etc. By overlapping the execution of instructions, the rate at which the processor can execute instructions is increased.

Parallel operations of single instruction on multiple data is also possible in modern microprocessors. A parallel operation where a single instruction operates on multiple data simultaneously is referred to as single instruction, multiple data (SIMD) processing. A way of increasing the efficiency of SIMD processing is to load from or store to a storage space, e.g., main memory or higher order cache, multiple data.

Each microprocessor may be different from other microprocessors in various aspect. For instance, a microprocessor with two banks in memory loads from and stores to memory, or cache data, differently than a microprocessor with four banks in memory. A program or a code written for a microprocessor may need to be rewritten to be ran on a microprocessor with a different memory access and management architecture.

SUMMARY

This disclosure relates generally to the field of DSPs. More particularly, but not by way of limitation, aspects of the present disclosure relate to a method for executing an interleaving store instruction by a processor. According to an aspect of the present disclosure, an instruction to interleave values of registers of a processor to store is executed by a second type processor to emulate a first type processor. According to an aspect of the present disclosure, the instruction to interleave values that is executed by the second type processor is translated from an instruction to interleave values of registers of a first type processor. According to an aspect of the present invention, the register of the first type processor and the register of the second type processor is of a different size.

According to an aspect of the present invention, the interleaved values of the second type processor registers comprises data elements of a vector stored in each of the second type processor registers. The vector of the each of the second type processor is of a size that is also storable in the first type processor register. The second type processor blocks one or more lanes of its registers so the size of the each of the registers matches the size of its respective vector.

BRIEF DESCRIPTION OF THE DRAWINGS

For a detailed description of various examples, reference will now be made to the accompanying drawings in which.

DETAILED DESCRIPTION

Figure 1:
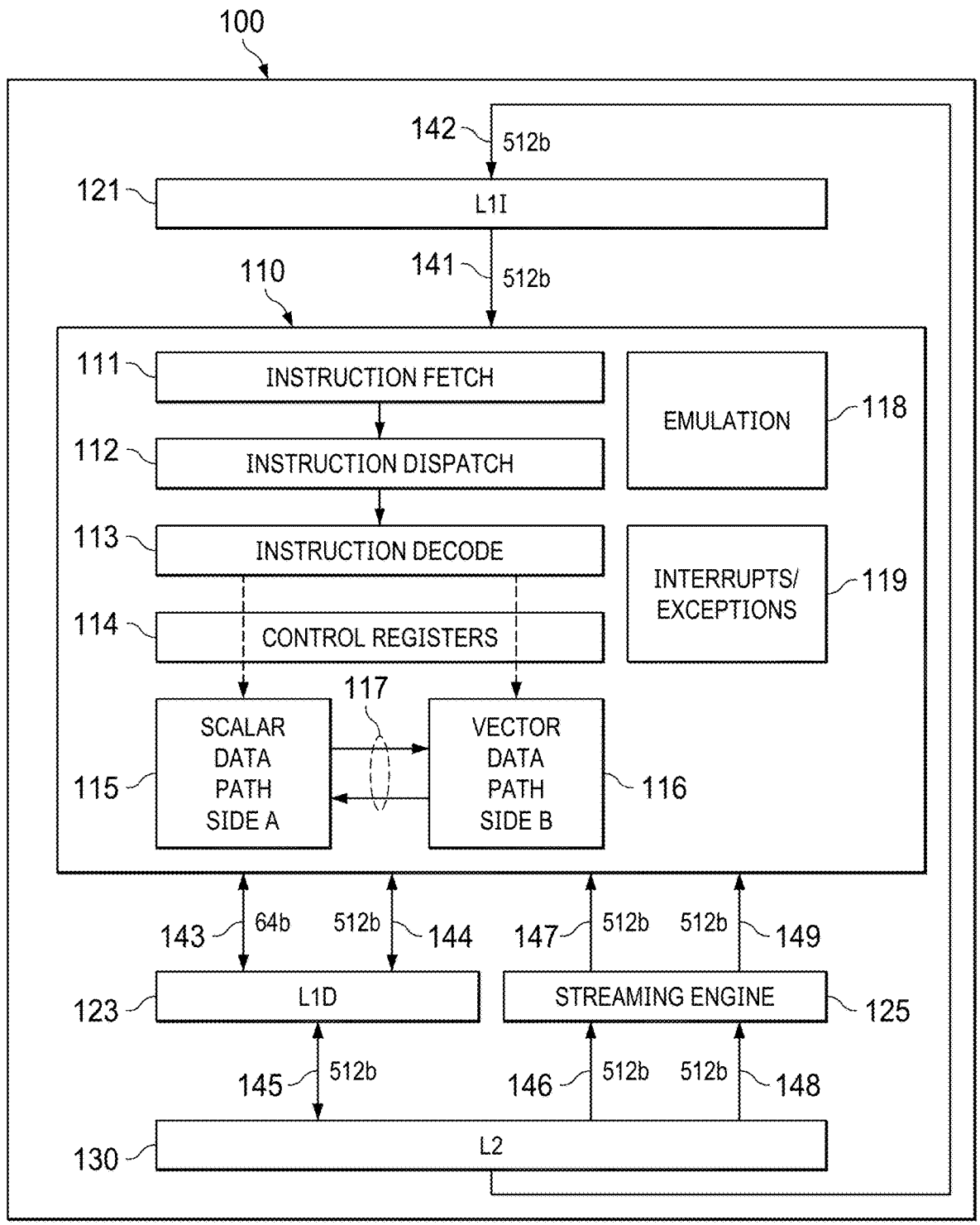
FIG. 1 illustrates an example of dual scalar/vector data path processor.

In the drawings, like elements are denoted by like reference numerals for consistency.

FIG. 1 illustrates an example processor 100 that includes dual scalar/vector data paths 115, 116. Processor 100 includes a streaming engine 125, level one instruction cache (L1I) 121 and level one data cache (L1D) 123. Processor 100 further includes a level two, combined instruction/data cache (L2) 130 that holds both instructions and data.

FIG. 1 illustrates a connection between L1I cache 121 and L2 combined instruction/data cache 130 by way of 512-bit bus 142. FIG. 1 further illustrates a connection between L1D cache 123 and L2 combined instruction/data cache 130, 512-bit bus 145. In the example of processor 100, L2 combined instruction/data cache 130 stores both instructions to back up L1I cache 121 and data to back up L1D cache 123. In one example, L2 combined instruction/data cache 130 is further connected to higher level cache and/or memory using known or later developed memory system techniques not illustrated in FIG. 1.

The size of L1I cache 121, L1D cache 123, and L2 cache 130 may be implemented in different sizes in various examples; in this example, L1I cache 121 and L1D cache 123 are each 32 Kbytes, and L2 cache 130 is 1024 Kbytes. In one example, central processing unit core 110, L1I cache 121, L1D cache 123, and L2 combined instruction/data cache 130 are formed on a single integrated circuit. The singled integrated circuit may include other circuits.

Central processing unit core 110 fetches instructions from L1I cache 121 as controlled by instruction fetch unit 111. Instruction fetch unit 111 determines the next instructions to be executed and recalls a fetch packet sized set of such instructions. Instructions are directly fetched from L1I cache 121 upon a cache hit (if these instructions are stored in L1I cache 121). Upon a cache miss (the specified instruction fetch packet is not stored in L1I cache 121), these instructions are sought in L2 combined cache 130. In one example, the size of a cache line in L1I cache 121 equals the size of a fetch packet, which is 512 bits.

The memory locations of these instructions are either a hit in L2 combined cache 130 or a miss. A hit is serviced from L2 combined cache 130. A miss is serviced from a higher level of cache (not illustrated) or from main memory (not illustrated). In one example, the requested instruction is simultaneously supplied to both L1I cache 121 and central processing unit core 110 to speed use.

In FIG. 1, central processing unit core 110 includes multiple functional units to perform instruction specified data processing tasks. Instruction dispatch unit 112 determines the target functional unit of each fetched instruction. In one example, central processing unit 110 operates as a very long instruction word (VLIW) processor capable of operating on multiple instructions in corresponding functional units simultaneously. Preferably, a compiler organizes instructions in execute packets that are executed together.

Instruction dispatch unit 112 directs each instruction to its target functional unit. The functional unit assigned to an instruction is completely specified by the instruction produced by a compiler. The hardware of central processing unit core 110 has no part in this functional unit assignment. In one example, instruction dispatch unit 112 may operate on several instructions in parallel. The number of such parallel instructions is set by the size of the execute packet.

One part of the dispatch task of instruction dispatch unit 112 is determining whether the instruction is to execute on a functional unit in scalar data path side A 115 or vector data path side B 116. An instruction bit within each instruction called the s bit determines which data path the instruction controls.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. Instructions, from time to time, can include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar data path side A 115 and vector data path side B 116. This information, from time to time, can include mode information or the like.

The decoded instructions from instruction decode unit 113 and information stored in control registers 114 are supplied to scalar data path side A 115 and vector data path side B 116. As a result, functional units within scalar data path side A 115 and vector data path side B 116 perform instruction specified data processing operations upon instruction specified data and store the results in an instruction specified data register or registers. Each of scalar data path side A 115 and vector data path side B 116 includes multiple functional units that operate in parallel. Data path 117 between scalar data path side A 115 and vector data path side B 116 permits data exchange.

Central processing unit core 110 includes further non-instruction-based modules. Emulation unit 118 permits determination of the machine state of central processing unit core 110 in response to instructions. The capability will typically be employed for algorithmic development. Interrupts/exceptions unit 119 enables central processing unit core 110 to be responsive to external, asynchronous events (interrupts) and to respond to attempts to perform improper operations (exceptions).

Processor 100 includes streaming engine 125. Streaming engine 125 supplies two data streams from predetermined addresses typically cached in L2 combined cache 130 to register files of vector data path side B of central processing unit core 110. This provides controlled data movement from memory (as cached in L2 combined cache 130) directly to functional unit operand inputs.

FIG. 1 further illustrates example data widths of buses between various parts. L1I cache 121 supplies instructions to instruction fetch unit 111 via bus 141. In one example, bus 141 is a 512-bit bus. Bus 141 is unidirectional from L1I cache 121 to central processing unit 110. L2 combined cache 130 supplies instructions to L1I cache 121 via bus 142. In one example, bus 142 is a 512-bit bus. Bus 142 is unidirectional from L2 combined cache 130 to L1I cache 121.

L1D cache 123 exchanges data with register files in scalar data path side A 115 via bus 143. In one example, bus 143 is a 64-bit bus. L1D cache 123 exchanges data with register files in vector data path side B 116 via bus 144. In one example, bus 144 is a 512-bit bus. Buses 143 and 144 are illustrated as bidirectional supporting both central processing unit 110 data reads and data writes. L1D cache 123 exchanges data with L2 combined cache 130 via bus 145. In one example, bus 145 is a 512-bit bus. Bus 145 is illustrated as bidirectional supporting cache service for both central processing unit 110 data reads and data writes.

Processor data requests are directly fetched from L1D cache 123 upon a cache hit (if the requested data is stored in L1D cache 123). Upon a cache miss (the specified data is not stored in L1D cache 123), the data is sought in L2 combined cache 130. The memory locations of this requested data are either a hit in L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and central processing unit core 110 to speed use.

L2 combined cache 130 supplies data of a first data stream to streaming engine 125 via bus 146. In one example, bus 146 is a 512-bit bus. Streaming engine 125 supplies data of this first data stream to functional units of vector data path B 116 via bus 147. In one example, bus 147 is a 512-bit bus. L2 combined cache 130 supplies data of a second data stream to streaming engine 125 via bus 148. Bus 148 is a 512-bit bus in one example. Streaming engine 125 supplies data of this second data stream to functional units of vector data path side B 116 via bus 149, which is a 512-bit bus in one example. Buses 146, 147, 148, and 149 are illustrated as unidirectional from L2 combined cache 130 to streaming engine 125 and to vector data path side B 116 in accordance with one example.

Streaming engine data requests are directly fetched from L2 combined cache 130 upon a cache hit (if the requested data is stored in L2 combined cache 130). Upon a cache miss (the specified data is not stored in L2 combined cache 130), this data is sought from another level of cache (not illustrated) or from main memory (not illustrated). It is technically feasible in some examples for L1D cache 123 to cache data not stored in L2 combined cache 130. If such operation is supported, then upon a streaming engine data request that is a miss in L2 combined cache 130, L2 combined cache 130 should snoop L1D cache 123 for the data requested by the streaming engine 125. If L1D cache 123 stores this data, its snoop response would include the data, which is then supplied to service the streaming engine request. If L1D cache 123 does not store this data, its snoop response would indicate this and L2 combined cache 130 must service this streaming engine request from another level of cache (not illustrated) or from main memory (not illustrated).

Figure 2:
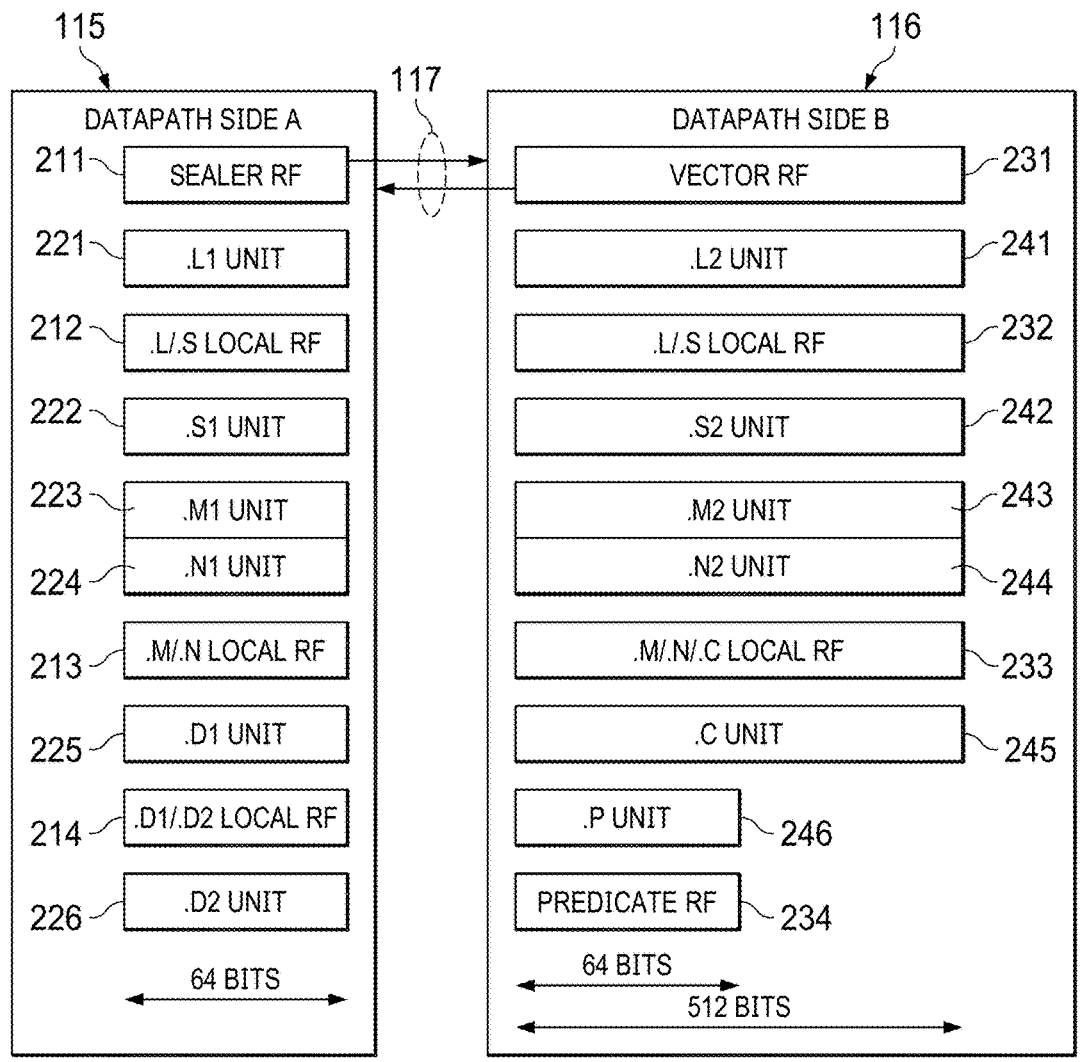
FIG. 2 illustrates the register files and functional units in the dual scalar/vector data path processors illustrated in FIG. 1.

FIG. 2 illustrates further details of functional units and register files within scalar data path side A 115 and vector data path side B 116. Scalar data path side A 115 includes L1 unit 221, S1 unit 222, M1 unit 223, N1 unit 224, D1 unit 225, and D2 unit 226. Scalar data path side A 115 includes global scalar register file 211, L1/S1 local register file 212, M1/N1 local register file 213, and D1/D2 local register file 214. Vector data path side B 116 includes L2 unit 241, S2 unit 242, M2 unit 243, N2 unit 244, C unit 245, and P unit 246. Vector data path side B 116 includes global vector register file 231, L2/S2 local register file 232, M2/N2/C local register file 233 and predicate register file 234. There are limitations upon which functional units may read from or write to which register files.

Scalar data path side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213, or D1/D2 local register file 214.

Scalar data path side A 115 includes S1 unit 222. S1 unit 222 generally accepts two 64-bit operands and produces one 64-bit result. The two operands are each recalled from an instruction specified register in either global scalar register file 211 or L1/S1 local register file 212. In one example, S1 unit 222 performs the same type of operations as L1 unit 221. In another example, there may be slight variations between the data processing operations supported by L1 unit 221 and S1 unit 222. The result may be written into an instruction specified register of global scalar register file 211, L1/S1 local register file 212, M1/N1 local register file 213, or D1/D2 local register file 214.

Scalar data path side A 115 includes M1 unit 223. M1 unit 223 generally accepts two 64-bit operands and produces one 64-bit result. The two operands are each recalled from an instruction specified register in either global scalar register file 211 or M1/N1 local register file 213. In one example, M1 unit 223 performs the following instruction selected operations: 8-bit multiply operations; complex dot product operations; 32-bit count operations; complex conjugate multiply operations; and bit wise logical operations, moves, adds, and subtracts. The result may be written into an instruction specified register of global scalar register file 211, L1/S1 local register file 212, M1/N1 local register file 213, or D1/D2 local register file 214.

Scalar data path side A 115 includes N1 unit 224. N1 unit 224 generally accepts two 64-bit operands and produces one 64-bit result. The two operands are each recalled from an instruction specified register in either global scalar register file 211 or M1/N1 local register file 213. In one example, N1 unit 224 performs the same type of operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213, or D1/D2 local register file 214.

Scalar data path side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. In one example, D1 unit 225 and D2 unit 226 also perform: swapping, pack and unpack on the load and store data; 64-bit SIMD arithmetic operations; and 64-bit bit wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector data path side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. In one example, L2 unit 241 performs instruction similar to L1 unit 221 except on wider 512-bit data. The result may be written into an instruction specified register of global vector register file 231, L2/S2 local register file 232, M2/N2/C local register file 233, or predicate register file 234.

Vector data path side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. In one example, S2 unit 242 performs instructions similar to S1 unit 222, except on wider 512-bit data. The result may be written into an instruction specified register of global vector register file 231, L2/S2 local register file 232, M2/N2/C local register file 233 or predicate register file 234.

Vector data path side B 116 includes M2 unit 243. M2 unit 243 generally accepts two 512-bit operands and produces one 512-bit result. The two operands are each recalled from an instruction specified register in either global vector register file 231 or M2/N2/C local register file 233. In one example, M2 unit 243 performs instructions similar to M1 unit 223 except on wider 512-bit data. The result may be written into an instruction specified register of global vector register file 231, L2/S2 local register file 232 or M2/N2/C local register file 233.

Vector data path side B 116 includes N2 unit 244. N2 unit 244 generally accepts two 512-bit operands and produces one 512-bit result. The two operands are each recalled from an instruction specified register in either global vector register file 231 or M2/N2/C local register file 233. In one example, N2 unit 244 performs the same type of operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2N2/C local register file 233.

Vector data path side B 116 includes correlation (C) unit 245. C unit 245 generally accepts two 512-bit operands and produces one 512-bit result. The two operands are each recalled from an instruction specified register in either global vector register file 231 or M2/N2/C local register file 233.

Vector data path side B 116 includes P unit 246. Vector predicate (P) unit 246 performs basic logic operations on registers of local predicate register file 234. P unit 246 has direct access to read from and write to predicate register file 234.

Figures 3, 4, 5, 6:
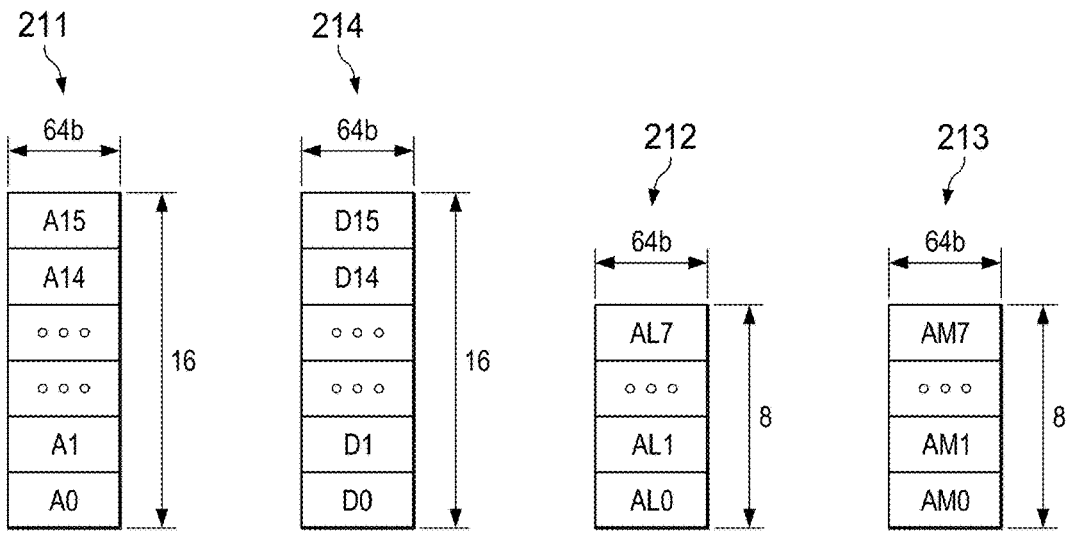
FIG. 3 illustrates a global scalar register file.
FIG. 4 illustrates a local scalar register file shared by arithmetic functional units.
FIG. 5 illustrates a local scalar register file shared by multiply functional units.
FIG. 6 illustrates a local scalar register filed shared by load/store units.

FIG. 3 illustrates global scalar register file 211. There are 16 independent 64-bit wide scalar registers designated A0 to A15. Each register of global scalar register file 211 can be read from or written to as 64-bits of scalar data. All scalar data path side A 115 functional units (L1 unit 221, S1 unit 222, M1 unit 223, N1 unit 224, D1 unit 225 and D2 unit 226) can read from or write to global scalar register file 211. Global scalar register file 211 may be read from as 32-bits or as 64-bits and may only be written to as 64-bits in one example. The instruction executing determines the read data size. Vector data path side B 116 functional units (L2 unit 241, S2 unit 242, M2 unit 243, N2 unit 244, C unit 245 and P unit 246) can read from global scalar register file 211 via cross path 117 under restrictions that will be detailed below.

FIG. 4 illustrates D1/D2 local register file 214. There are sixteen independent 64-bit wide scalar registers designated D0 to D15. Each register of D1/D2 local register file 214 can be read from or written to as 64-bits of scalar data. All scalar data path side A 115 functional units (L1 unit 221, S1 unit 222, M1 unit 223, N1 unit 224, D1 unit 225, and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

FIG. 5 illustrates L1/S1 local register file 212. In this example, L1/S1 local register file 212 includes eight independent 64-bit wide scalar registers designated AL0 to AL7. In this example, the instruction coding permits L1/S1 local register file 212 to include up to 16 registers, but only eight registers are implemented to reduce circuit size and complexity. Each register of L1/S1 local register file 212 can be read from or written to as 64-bits of scalar data. All scalar data path side A 115 functional units (L1 unit 221, S1 unit 222, M1 unit 223, N1 unit 224, D1 unit 225, and D2 unit 226) can write to L1/S1 local scalar register file 212. Only L1 unit 221 and S1 unit 222 can read from L1/S1 local scalar register file 212.

FIG. 6 illustrates M1/N1 local register file 213. In this example, eight independent 64-bit wide scalar registers designated AM0 to AM7 are implemented. In this example, the instruction coding permits M1/N1 local register file 213 to include up to 16 registers, but only eight registers are implemented to reduce circuit size and complexity. Each register of M1/N1 local register file 213 can be read from or written to as 64-bits of scalar data. All scalar data path side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
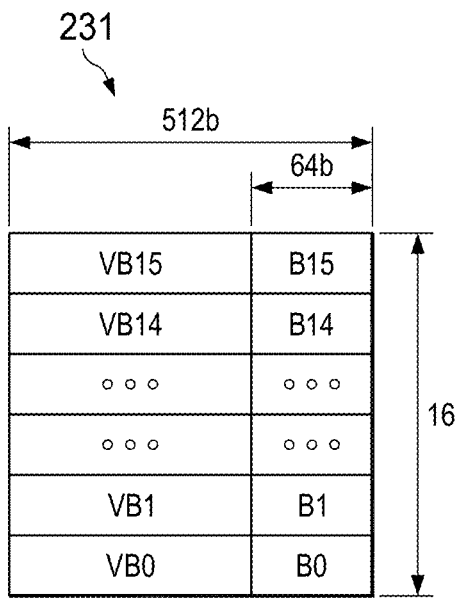
FIG. 7 illustrates a global vector register file.

FIG. 7 illustrates global vector register file 231. There are sixteen independent 512-bit wide vector registers. Each register of global vector register file 231 can be read from or written to as 64 bits of scalar data designated B0 to B15. Each register of global vector register file 231 can be read from or written to as 512 bits of vector data designated VB0 to VB15. The instruction type determines the data size. All vector data path side B 116 functional units (L2 unit 241, S2 unit 242, M2 unit 243, N2 unit 244, C unit 245, and P unit 246) can read from or write to global vector register file 231. Scalar data path side A 115 functional units (L1 unit 221, S1 unit 222, M1 unit 223, N1 unit 224, D1 unit 225, and D2 unit 226) can read from global vector register file 231 via cross path 117 under restrictions that will be detailed below.

Figure 8:
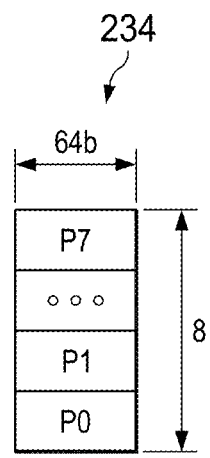
FIG. 8 illustrates a predicate register file.

FIG. 8 illustrates predicate (P) local register file 234. There are eight independent 64-bit wide registers designated P0 to P7. Each register of P local register file 234 can be read from or written to as 64 bits of scalar data. Vector data path side B 116 functional units L2 unit 241, S2 unit 242, C unit 244 and P unit 246 can write to P local register file 234. Only L2 unit 241, S2 unit 242, and P unit 246 can read from P local scalar register file 234. A commonly expected use of P local register file 234 includes: writing one-bit SIMD vector comparison results from L2 unit 241, S2 unit 242, or C unit 245; manipulation of the SIMD vector comparison results by P unit 246; and use of the manipulated results in control of a further SIMD vector operation.

Figure 9:
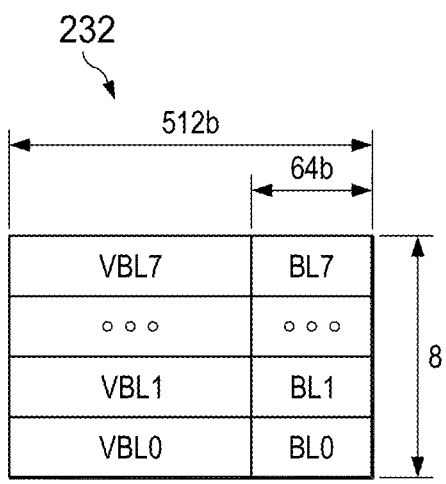
FIG. 9 illustrates a local vector register file shared by arithmetic functional units.

FIG. 9 illustrates L2/S2 local register file 232. In this example, eight independent 512-bit wide vector registers are implemented. In this example, the instruction coding permits L2/S2 local register file 232 to include up to sixteen registers, but only eight registers are implemented to reduce circuit size and complexity. Each register of L2/S2 local vector register file 232 can be read from or written to as 64 bits of scalar data designated BL0 to BL7. Each register of L2/S2 local vector register file 232 can be read from or written to as 512 bits of vector data designated VBL0 to VBL7. The instruction type determines the data size. All vector data path side B 116 functional units (L2 unit 241, S2 unit 242, M2 unit 243, N2 unit 244, C unit 245, and P unit 246) can write to L2/S2 local vector register file 232. Only L2 unit 241 and S2 unit 242 can read from L2/S2 local vector register file 232.

Figure 10:
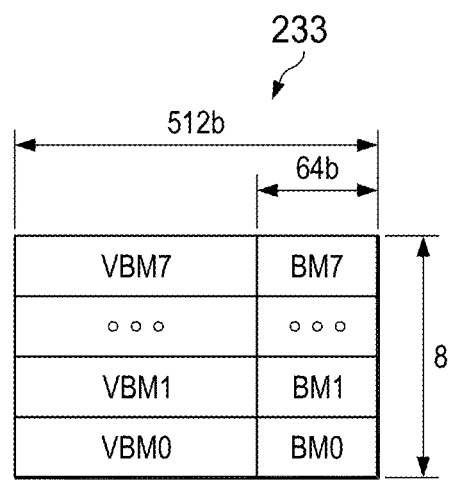
FIG. 10 illustrates a local vector register file shared by the multiply and correlation functional units.

FIG. 10 illustrates M2/N2/C local register file 233. In this example, eight independent 512-bit wide vector registers are implemented. In this example, the instruction coding permits M2/N2/C local register file 233 to include up to sixteen registers, but only eight registers are implemented to reduce circuit size and complexity. Each register of M2/N2/C local vector register file 233 can be read from or written to as 64 bits of scalar data designated BM0 to BM7. Each register of M2/N2/C local vector register file 233 can be read from or written to as 512 bits of vector data designated VBM0 to VBM7. All vector data path side B 116 functional units (L2 unit 241, S2 unit 242, M2 unit 243, N2 unit 244, C unit 245, and P unit 246) can write to M2/N2/C local vector register file 233. Only M2 unit 243, N2 unit 244, and C unit 245 can read from M2/N2/C local vector register file 233.

The provision of global register files accessible by all functional units of a side and local register files accessible by only some of the functional units of a side is a design choice. In another example, a different accessibility provision could be made, such as employing only one type of register file corresponding to the global register files described herein.

Cross path 117 permits limited exchange of data between scalar data path side A 115 and vector data path side B 116. During each operational cycle one 64-bit data word can be recalled from global scalar register file A 211 for use as an operand by one or more functional units of vector data path side B 116 and one 64-bit data word can be recalled from global vector register file 231 for use as an operand by one or more functional units of scalar data path side A 115. Any scalar data path side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231.

Multiple scalar data path side A 115 functional units may employ the same 64-bit cross path data as an operand during the same operational cycle. However, in this example, only one 64-bit operand is transferred from vector data path side B 116 to scalar data path side A 115 in any single operational cycle. Any vector data path side B 116 functional unit (L2 unit 241, S2 unit 242, M2 unit 243, N2 unit 244, C unit 245, and P unit 246) may read a 64-bit operand from global scalar register file 211. If the corresponding instruction is a scalar instruction, the cross-path operand data is treated as any other 64-bit operand. If the corresponding instruction is a vector instruction, the upper 448 bits of the operand are zero filled. Multiple vector data path side B 116 functional units may employ the same 64-bit cross path data as an operand during the same operational cycle. In one example, only one 64-bit operand is transferred from scalar data path side A 115 to vector data path side B 116 in any single operational cycle.

Figure 11:
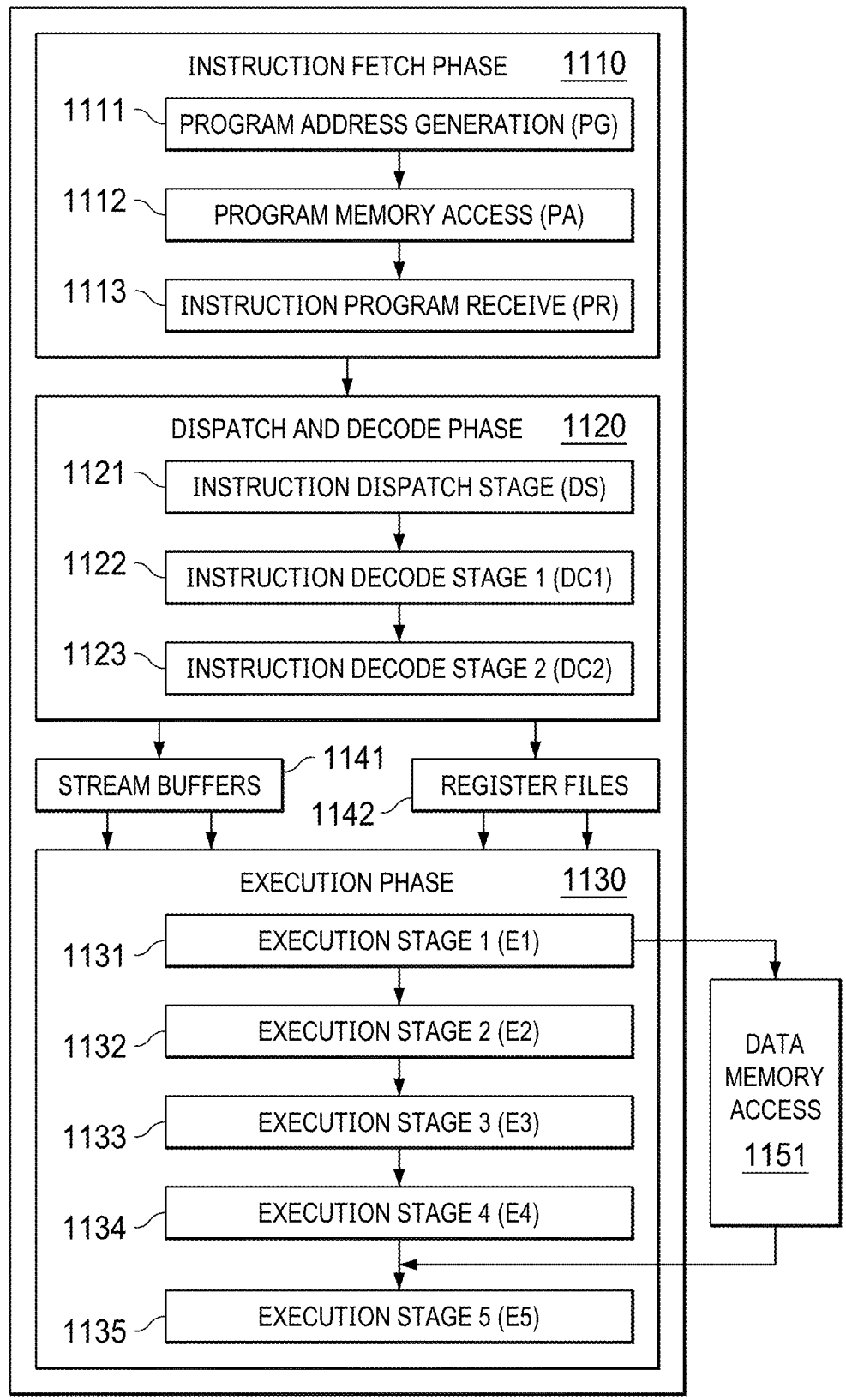
FIG. 11 illustrates pipeline phases of the central processing unit of this example.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation (PG) stage 1111, program access (PA) stage 1112, and program receive (PR) stage 1113. During program address generation stage 1111, the program address is generated in the processor and the read request is sent to the memory controller for the L1I cache. During the program access stage 1112, the L1I cache processes the request, accesses the data in its memory, and sends a fetch packet to the processor boundary. During the program receive stage 1113, the processor registers the fetch packet. Instructions are fetched in a fetch packet that includes sixteen 32-bit wide words.

Processor core 110 (FIG. 1) and L1I cache 121 pipelines (FIG. 1) are de-coupled from each other. Fetch packet returns from L1I cache can take a different number of clock cycles, depending on external circumstances such as whether there is a hit in L1I cache 121 or a hit in L2 combined cache 130. Therefore, program access stage 1112 can take several clock cycles instead of one clock cycle as in the other stages.

The instructions executing in parallel constitute an execute packet. In this example, an execute packet can contain up to sixteen 32-bit wide slots for sixteen instructions. No two instructions in an execute packet may use the same functional unit. A slot is one of five types: 1) a self-contained instruction executed on one of the functional units of processor core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245, and P unit 246); 2) a unitless instruction such as a NOP (no operation) instruction or multiple NOP instructions; 3) a branch instruction; 4) a constant field extension; and 5) a conditional code extension.

Dispatch and decode phases 1120 (FIG. 11) include instruction dispatch to appropriate execution unit (DS) stage 1121, instruction pre-decode (DC1) stage 1122, and instruction decode, operand read (DC2) stage 1123. During instruction dispatch to appropriate execution unit stage 1121, the fetch packets are split into execute packets and assigned to the appropriate functional units. During the instruction pre-decode stage 1122, the source registers, destination registers and associated paths are decoded for the execution of the instructions in the functional units. During the instruction decode, operand reads stage 1123, more detailed unit decodes are done, as well as reading operands from the register files.

Execution phase 1130 includes execution (E1 to E5) stages 1131 to 1135. Different types of instructions require different numbers of these stages to complete their execution. These stages of the pipeline play an important role in understanding the device state at processor cycle boundaries.

During E1 stage 1131, the conditions for the instructions are evaluated and operands are operated on. As illustrated in FIG. 11, E1 stage 1131 may receive operands from a stream buffer 1141 and one of the register files shown schematically as 1142. For load and store instructions, address generation is performed, and address modifications are written to a register file. For branch instructions, branch fetch packet in the PG phase (1111) is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after E1 stage 1131.

During E2 stage 1132, load instructions send the address to memory. Store instructions send the address and data to memory. Single-cycle instructions that saturate results set the saturation (SAT) bit in the control status register (CSR) if saturation occurs. For 2-cycle instructions, results are written to a destination register file.

During E3 stage 1133, data memory accesses are performed. Any multiply instructions that saturate results set the SAT bit in the control status register (CSR) if saturation occurs. For 3-cycle instructions, results are written to a destination register file.

During E4 stage 1134, load instructions bring data to the processor boundary. For 4-cycle instructions, results are written to a destination register file.

During E5 stage 1135, load instructions write data into a register. This is illustrated schematically in FIG. 11 with input from memory 1151 to E5 stage 1135.

In one example of the present disclosure, a 512-bit register is utilized for SIMD operations executed on the processor of FIGS. 1 and 2. Depending on the size of the data element, different number of operations may be performed in parallel. For instance, in one example, a size of a word is 32-bits (4 Bytes) and half word is 16-bits (2 Bytes). Where a data precision of an input data is half word (2 Bytes), 32 lanes exist in a 512-bit (64 Bytes) register, allowing 32 parallel operations. Where a data precision is 64-bits (8 Bytes), 8 lanes exist in a 512-bit (64 Bytes) register, allowing 8 parallel operations. Where a data precision is 32-bits (4 Bytes), 16 lanes exist in a 512-bit (64 Bytes) register, allowing 16 parallel operations.

In one example, the number of lanes of a register is equal to the number of functional units performing arithmetic functions on the register. For instance, where 32 lanes exist in a register, 32 functional units perform an arithmetic function on a respective data element on the register file. In this example, the size of the respective data element may be half word (2 Bytes) when the size of the register is 512-bits.

Figure 12:
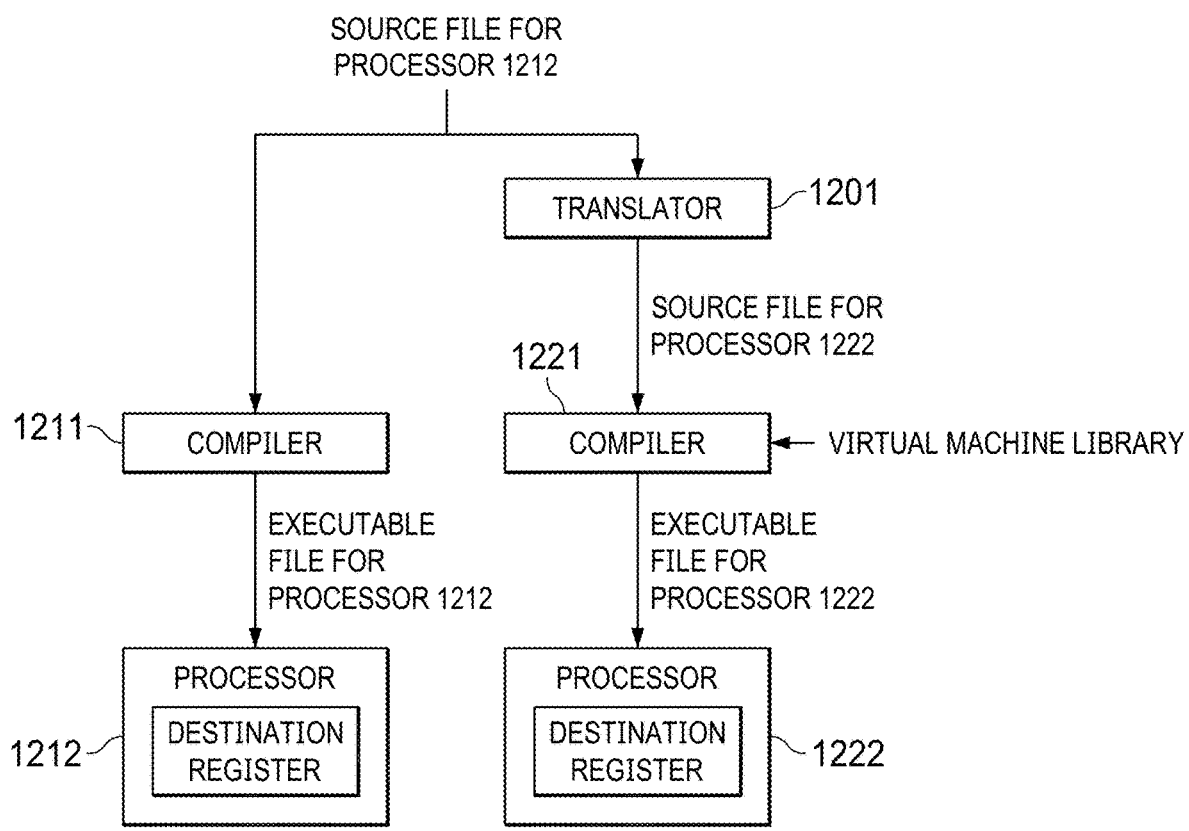
FIG. 12 illustrates a system storing register data elements to interleave with data elements of a different register according to an aspect of the present invention.

According to an aspect of the present disclosure, a compiler is configured to run on a processor and generates a code that runs a processor of FIGS. 1 and 2. The compiler is further configured to generate an instruction of interleaving vector data elements from multiple registers and storing the interleaved values in a single register, cache or memory. Multiple instructions may be generated by the compiler to emulate a processor with an architecture different than the architecture illustrated in FIGS. 1 and 2. Processor architecture is defined by a particular set of instructions (ISA), including vector size, how it executes such operations, and how data is transferred in and out. An architecture of a first processor is different from an architecture of a second processor at least when the first processor and the second processor operates on a different size vector, or retrieves and stores values from and to a different size register FIG. 12 illustrates a system of two compilers, each configured to compile a source code into executable code for its respective processors, where the processors have different architecture from each other. According to an example of the present invention, a complier for a second type of processor generates an executable file for the second type of processor, based on a source code file prepared for a first type of processor. The second type of processor can emulate the first type of processor when the source code is executed on the second type of processor. While emulating the first type of processor, the second type of processor can also emulate an interleaving storing instruction prepared for the first type of processor.

In FIG. 12, a source file is written to be executed on the first type of processor, processor 1212. To execute the source file on processor 1212, compiler 1211 compiles the source code to generate an executable file for processor 1212. Compiler 1211 may also operate as an assembler and a linker to generate the executable file for processor 1212, based on the types of source file and its structure.

Translator 1201 of FIG. 12 translates the source file written for processor 1212 to a source file for the second type of processor, processor 1222. Compiler 1221, which compiles the source code generated by translator 1201, generates an executable file for processor 1222. Compiler 1221 may rely on routines, modules or objects stored in libraries, e.g., virtual machine libraries, to generate the executable file for processor 1222.

When the executable file generated by compiler 1221 is executed by processor 1222, processor 1222 emulates the operations and functions of processor 1212. Processor 1222 has a different architecture than processor 1212. For example, processor 1222 may operate on vectors that are wider (512 bits) than vectors for processor 1212 (320 bits). Processor 1222 may have variable width lanes per register, e.g., 8, 12, 32, and 64 lanes, to accommodate various operations based on a different size or wider vectors. Processor 1212 may have one set of registers of 40 bits data elements with a fixed number of register lanes, which is 8. Processor 1222 may have a vector predication mechanism that allows only certain lanes of a register to be stored, while processor 1212 may have an interleaving store instruction that allows interleaving storing of its vectors. Processor 1222 emulates the interleaving store function of processor 1212 based on an interleaving store instruction compiled by complier 1221 and its vector predication mechanism. Processor 1222 may be a processor illustrated in FIGS. 1 and 2.

To emulate processor 1212, translator 1201 translates a source code for processor 1212 and compiler 1221 generates an executable file with the following examples of interleaving store instruction, e.g., VSTINLB, VSTINTLB4, VSTINTLH, VSTINTLW, VSTINTLD. When processor 1222 executes these files, it emulates processor 1212 and its interleaving store instruction.

VSTINTLB instruction takes two input vectors (Input 1, Input 2), each 64 Bytes (512 bits) wide, interleaves even Byte elements from Input 1 and Input 2, and stores the interleaved Output in a storage structure, such as another register, higher order cache, or memory.

Input 1: A63, A62, A61, A60, . . . A4, A3, A2, A1, A0
Input 2: B63, B62, B61, B60, . . . B4, B3, B2, B1, B0
Output: B62, A62, B60, A60, . . . B4, A4, B2, A2, B0, A0

In this above, vector Input 1 has 64 data elements, A63~A0, and vector Input 2 has 64 data elements, B63-B0. When VSTINTLB is executed, vector Output of 64 data elements comprised of alternating even-byte elements from two input vectors, i.e., vector Input 1 and vector Input 2, is stored.

VSTINTLB4 instruction takes two input vectors (Input 1, Input 2), each 64 Bytes (512 bits) wide, interleaves every 4th Byte elements from Input 1 and Input 2, and stores the interleaved Output, expressed below, in a storage structure, such as another register, higher order cache, or memory.

Input 1: A63, A62, A61, A60, . . . A4, A3, A2, A1, A0
Input 2: B63, B62, B61, B60, . . . B4, B3, B2, B1, B0
Output: 0, 0, . . . 0, 0, B60, A60, . . . B4, A4, B0, A0

The resulting interleaved Output is still the size of one input vectors (e.g., Input 1 or Input 2), and the upper half of Output is filled with zeros.

VSTINTLH instruction takes even half-words from two input vectors (Input 1, Input 2), each 512 bits wide with half-word (2 Bytes) data elements, and stores the below vector Output in a storage structure, such as another register, higher order cache, or memory.

Input 1: A31, A30, A29, A28, . . . A4, A3, A2, A1, A0
Input 2: B31, B30, B29, B28, . . . B4, B3, B2, B1, B0
Output: B30, A30, B28, A28, . . . B4, A4, B2, A2, B0, A0

VSTINTLW instruction takes even words from two input vectors, each vector 512 bits wide with word (4 Bytes) data elements, and stores the even word data elements so that the even word data elements from one input vector interleave with the even word data elements from the other input vector, in a storage structure, such as another register, higher order cache, or memory. VSTINLD instruction takes even double-words from two input vectors, each vector 512 bits wide with double-word (8 Bytes) data elements, and stores the even double-word data elements so that the even double-word data elements from one input vector interleave with the double-word data elements from the other input vector, in a storage structure, such as another register, higher order cache, or memory.

Figures 13A, 13B, 13C, 13D:
FIGS. 13A~13D illustrate registers and memories of a system illustrated in FIG. 12.

FIGS. 13A-13D illustrate registers and memories for processor 1212 and processor 1222 of FIG. 12. FIG. 13A illustrates two vector registers, for vector Vn and vector Vn+1, of processor 1212. The vector registers of processor 1212 are each 320 bits and have 8 lanes. FIG. 13B illustrates a memory of processor 1212 that stores the interleaved values of vectors Vn and Vn+1 of FIG. 13A when an interleaving store instruction is executed by processor 1212. As seen in FIG. 13B, data elements of vectors Vn and Vn+1 are stored to interleave in the memory of processor 1212 at a row of address addr and addr+16.

FIG. 13C illustrates two vector registers, for vector Vn and vector Vn+1 of processor 1222. The vector registers of processor 1222 are each 512 bits and have 16 lanes. FIG. 13D illustrates a memory of processor 1222 that stores the interleaved values of vector Vn and Vn+1 of FIG. 13B, when the interleaving store instruction for processor 1212 is translated by translator 1201 as VSTINLH instruction.

When translator 1201 translates the instructions for processor 1212 to instructions for processor 1222, it generates a predication instruction in addition to the interleaving store instruction. The predication instruction is executed by processor 1222 to mask off the upper 8 lanes of vector registers of processor 1222, which has more lanes than the vector registers of processor 1212. The "xxxxxxxx" values of the registers of FIG. 13C represent the unused register lanes. The predication instruction sets up a predicate to store only the remaining 8 lanes of the registers of FIG. 13C. Upon the execution of VSTINLH instruction, the memory of processor 1222 stores values of vectors (FIG. 13D) the same as the memory of processor 1212 (FIG. 13B).

In this description, the recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A method comprising:
   receiving a processor instruction for a first processor that specifies a portion of a first vector stored in a first source register of the first processor, a portion of a second vector stored in a second source register of the first processor, and a first destination register;
   generating a predication instruction to mask one or more lanes of each of a third source register and a fourth source register of a second processor, in which the third and fourth source registers store the first and second vectors, respectively, and in which each of the third and fourth source registers is larger than each of the first and second source registers; and
   based on a translation of the processor instruction for execution by a second processor:
   reading the portion of the first vector from unmasked lanes of the third source register;
   reading the portion of the second vector from unmasked lanes of the fourth source register;
   interleaving the portion of the first vector read from the unmasked lanes of the third source register with the portion of the second vector read from the unmasked lanes of the fourth source register to produce a third vector; and
   storing the third vector in a second destination register of the second processor.

2. The method of claim 1, wherein the processor instruction specifies that the portion of the first vector is a set of non-consecutive elements of the first vector.

3. The method of claim 2, wherein the processor instruction specifies that the portion of the first vector is each even element of the first vector.

4. The method of claim 2, wherein the processor instruction specifies that the portion of the first vector is each fourth element of the first vector.

5. The method of claim 1, wherein:
   the second destination register is larger than the third vector; and
   the method further comprises generating a mask that specifies a first portion of the second destination register that includes the third vector and a second portion of the second destination register that does not include the third vector.

6. The method of claim 1, wherein the processor instruction further specifies an element size for each of the first vector and the second vector.

7. The method of claim 6, wherein the element size is one byte.

8. The method of claim 6, wherein the element size is a half word.

9. The method of claim 6, wherein the element size is a word.

10. The method of claim 1, wherein the third source register and the fourth source register are adjacent.

11. A circuit device comprising:
   a first processor that includes a first source register configured to store a first vector, a second source register configured to store a second vector;
   a second processor that includes a third source register configured to store the first vector, a fourth source register configured to store the second vector, and a destination register, wherein each of the third and fourth source registers is larger than each of the first and second source registers; and
   a translator configured to translate a processor instruction directed to the first processor, and generate a predication instruction to mask one or more lanes of each of the third and fourth source registers, wherein the translation of the processor instruction is configured to cause the second processor to:
   read the first vector from unmasked lanes of the third source register;
   read the second vector from unmasked lanes of the fourth source register;
   interleave a portion of the first vector read from the unmasked lanes of the third source register with a portion of the second vector read from the unmasked lanes of the fourth source register to produce a third vector; and
   store the third vector in the destination register.

12. The circuit device of claim 11, wherein the portion of the first vector is a set of non-consecutive elements of the first vector.

13. The circuit device of claim 12, wherein the third source register and the fourth source register have adjacent addresses.

14. The circuit device of claim 11, wherein the portion of the first vector is a set of even numbered elements of the first vector.

15. The circuit device of claim 11, wherein the portion of the first vector is each fourth element of the first vector.

16. The circuit device of claim 11, wherein:
the destination register is larger than the third vector; and
the predication instruction creates a mask that specifies a first portion of the destination register that includes the third vector and a second portion of the destination register that does not include the third vector.

17. The circuit device of claim 11, wherein the processor instruction specifies an element size for each of the first vector and the second vector.

18. The circuit device of claim 17, wherein the element size is from a group consisting of: one byte, a half word, and a word.

* * * * *